Dec. 15, 1964   R. G. FERRIS   3,161,412
MATERIAL UNLOADER AND SPREADER WITH EXTENSIBLE FLAILS
Filed Feb. 26, 1963   2 Sheets-Sheet 1
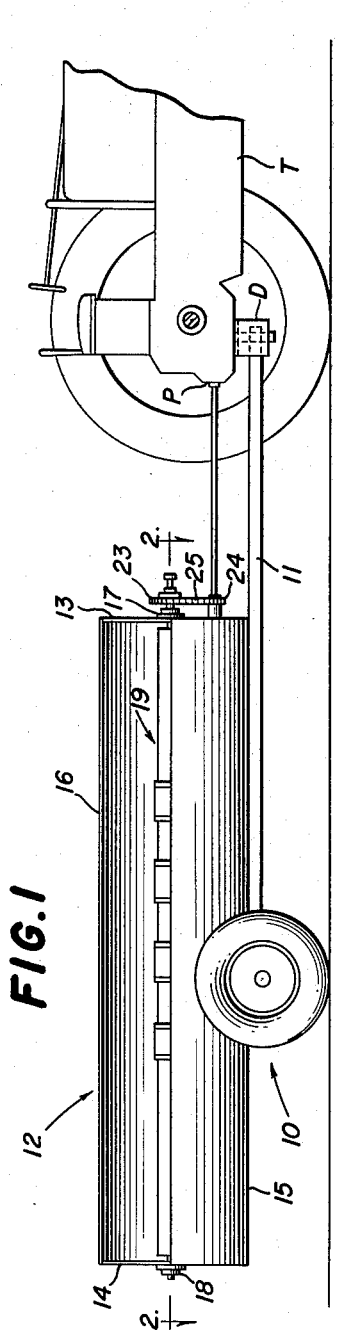
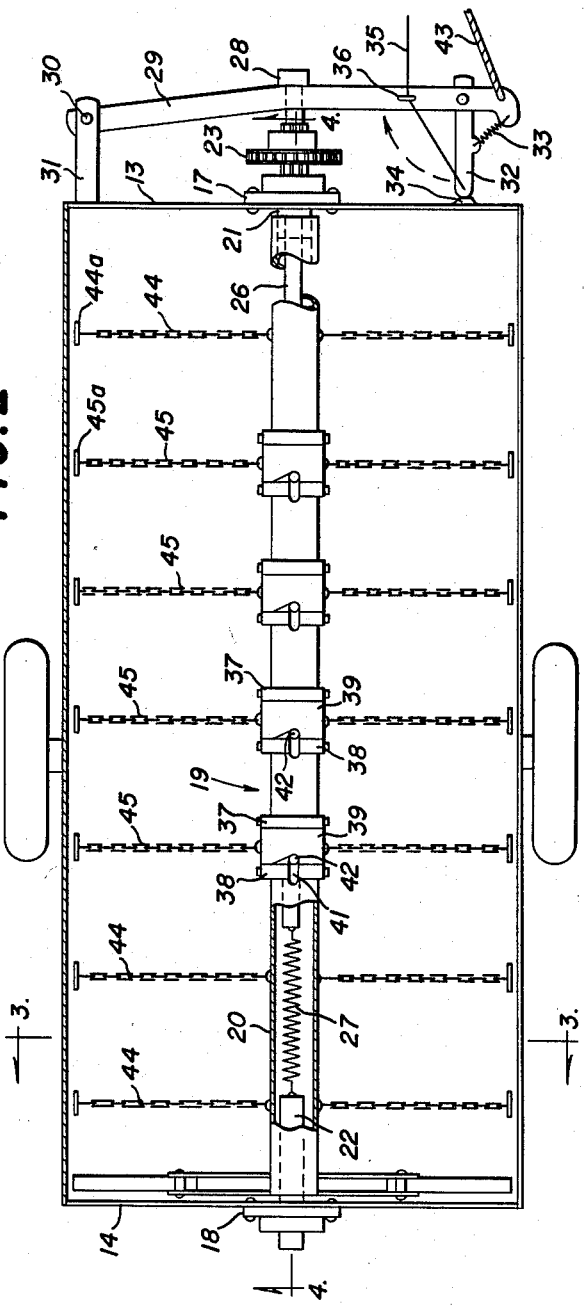
INVENTOR
ROBERT G. FERRIS
BY Hofgren, Wegner, Allen,
Stellman & McCord
ATTYS.

Dec. 15, 1964  R. G. FERRIS  3,161,412
MATERIAL UNLOADER AND SPREADER WITH EXTENSIBLE FLAILS
Filed Feb. 26, 1963  2 Sheets-Sheet 2

3,161,412
MATERIAL UNLOADER AND SPREADER WITH EXTENSIBLE FLAILS
Robert G. Ferris, Harvard, Ill., assignor to Starline, Inc., a corporation of Illinois
Filed Feb. 26, 1963, Ser. No. 261,117
9 Claims. (Cl. 275—3)

This invention relates to a flail type material unloading and spreading device, and in particular it relates to such a device in which the unloader shaft is provided with means for extending the flails progressively as material is unloaded from the container.

The present invention is directed to material spreaders of the type disclosed and claimed in Elwick Patent 2,886,332, and the principal object of the invention is to provide a mechanism which helps to even out the power requirements of the unit from the beginning to the end of an unloading cycle.

Material spreaders of the present type are used principally for spreading refuse on farm fields, and accordingly, they are most commonly drawn behind a farm tractor and the unloader shaft is driven from the tractor power take-off. The refuse is ordinarily heaped a substantial distance above the unloader shaft, so the starting load on the power take-off is usually quite large and decreases as the material is discharged from a container; although with some material the maximum load on the power take-off occurs later. Obviously, the unit may be used with smaller tractors if power requirements can be more even from the beginning to the end of an unloading cycle.

Reduction in the load differential during an unloading cycle is accomplished in accordance with the present invention by a novel combination of means which contribute two separate factors toward the desired end result. In the first place, the flexible flail members in one group are mounted upon sleeves that are independently rotatable with respect to a hollow unloader shaft upon which the sleeves are journaled, and means is provided for selectively clutching the sleeves to the unloader shaft for rotation therewith or releasing the shaft for rotation independently of the sleeves. Accordingly, this group of flails may advantageously be wound about the sleeves on which they are mounted and the sleeves may then be selectively rotated with the unloader shaft, or released from it, to permit extension of the flail members at any time in the unloading cycle.

In the second place, a second group of flails may be mounted directly upon the unloader shaft in the usual way, so that the only control over the extension of these flails with respect to the shaft is provided by the unloading of material from the areas of the container in which these flails operate. Thus, in the operation of the unit, the sleeves which carry one group of flails may be initially operatively disconnected from the unloader shaft so that only the group of flails mounted directly upon the shaft is operative to unload the material from the container. At a suitable time in the unloading cycle the sleeves may be clutched to the unloader shaft so that the flails mounted upon the sleeves may start to extend by reason of the rotation of the sleeves, and this extension of the sleeve mounted flails may be controlled through any suitable means.

The invention is illustrated in a preferred embodiment in the accompanying drawings, in which:

FIG. 1 is a side elevational view of a material unloader and spreader embodying the invention, the unit being illustrated as connected to a farm tractor;

FIG. 2 is a sectional view of the spreader on an enlarged scale, taken substantially as illustrated along the line 2—2 of FIG. 1 with the flails in extended position and with parts of the unloader assembly broken away;

Figure 6:
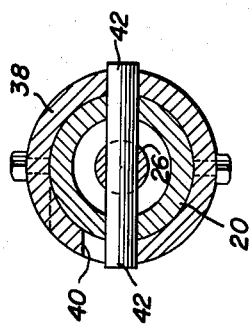
FIG. 6 is a section taken substantially as illustrated along the line 6—6 of FIG. 5.

Referring to the drawings in greater detail, and referring first to FIG. 1, a wheeled carriage, indicated generally at 10, is provided with a tongue 11 by means of which the carriage may be connected to the drawbar D of a tractor T; and surmounting the carriage is a material container, indicated generally at 12.

The container 12 has front and rear end walls 13 and 14, an arcuate bottom wall 15, and a hinged hood 16 which may be swung outwardly to facilitate loading the container.

Figure 4:
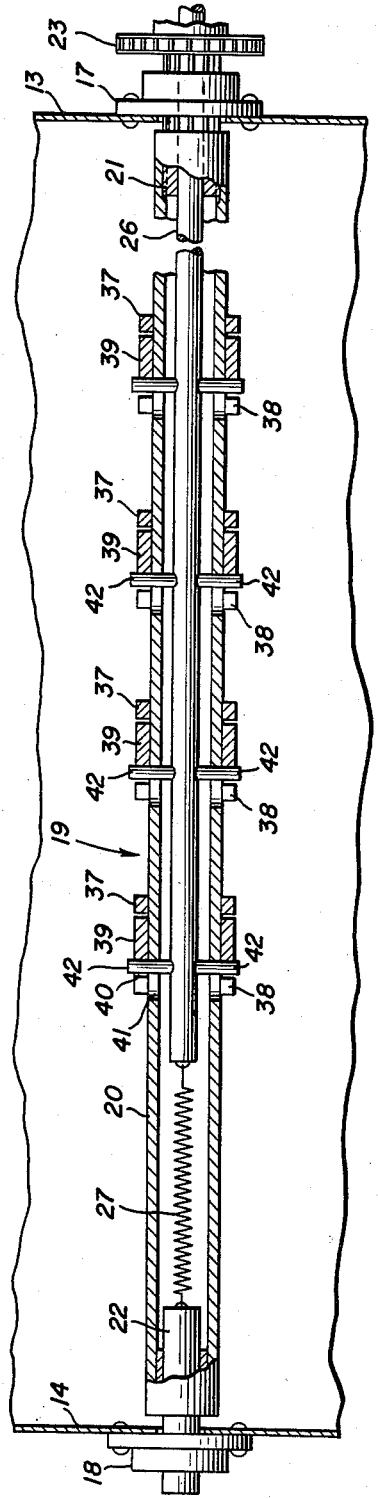
FIG. 4 is a fragmentary section on an enlarged scale taken substantially as illustrated along the line 4—4 of FIG. 2.

Front and rear self-aligning bearings 17 and 18 are mounted, respectively, in the end walls 13 and 14 of the container and support an unloader assembly, indicated generally at 19. As best seen in FIG. 4, the unloader assembly includes a tubular shaft 20 one end of which is keyed to a hollow splined shaft 21 which is rotatable in the bearing 17, and the other end of which is fitted with a stub shaft 22 that is rotatable in the bearing 18. Mounted at the front of the splined shaft 21 is a sprocket 23 by means of which the unloader assembly 19 is driven through a sprocket 24 and roller chain 25 from the power take-off P of the tractor.

Slidably mounted in the hollow splined shaft 21 is a clutch rod 26 which is normally drawn toward the stub shaft 22 at the rear of the unloader assembly by means of a tension spring 27. As best seen in FIG. 2, the clutch rod 26 extends entirely through the hollow splined shaft 21, and its forward end is provided with a head 28 which engages a control arm 29 that is pivoted at 30 on a bracket 31. A hinged stop leg 32 on the free end of the control arm 29 is normally retained in the position of FIG. 2 by a tension spring 33, and its free end bears against a pad 34 on the front wall 13 of the container. A first control cord 35 is secured to the free end of the hinged leg 32 and extends through a guide eye 36 on the control arm 29 so that the hinged leg may be collapsed against the tension of spring 33 by an operator on the tractor. When the hinged leg 32 is collapsed the tension spring 27 draws the clutch rod 26 toward the rear of the unloader assembly.

Figure 5:
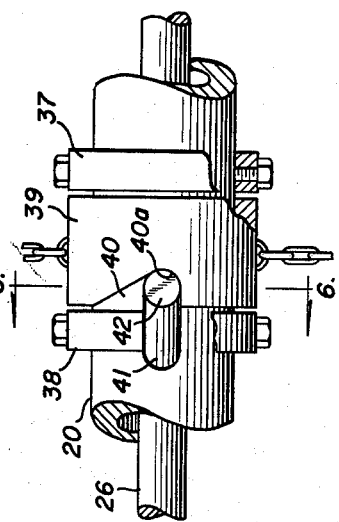
FIG. 5 is a fragmentary elevational view on an enlarged scale with parts broken away to show a detail of a portion of the unloader assembly.
Figure 3:
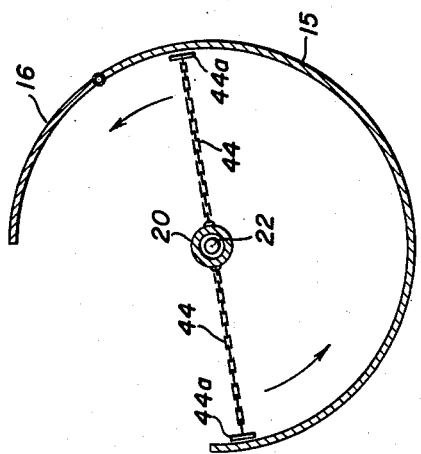
FIG. 3 is a section on a reduced scale taken substantially as illustrated along the line 3—3 of FIG. 2.

Referring now particularly to FIGS. 4 to 6, the tubular shaft 20 carries a plurality of fixed collars 37 and fixed split collars 38 which confine a plurality of sleeves 39 that are journaled upon the tubular shaft 20. Each sleeve 39 has a pair of recesses in the form of marginal notches 40, portions 40a of which are in radial register with longitudinal slots 41 in the tubular shaft 20. A plurality of radially extending clutch pins 42 are mounted on the clutch rod 26 and extend through the slots 41 and into engagement with the portions 40a of notches 40. Accordingly, it is apparent that when the clutch rod 26 is drawn rearwardly by the spring 27 the clutch pins 42 are disengaged from the marginal notches 40 in the sleeves 39, and the sleeves are freed from engagement with the tubular shaft 20 so that the shaft may rotate inside the sleeves. Conversely, when the clutch pins 42 are in the position illustrated in the drawings, the collars 39 rotate with the tubular shaft 20. Accordingly, the hinged leg 32 and control arm 29 may be manipulated by an operator on the tractor using the first control cord 35 and a second control cord 43 to cause the sleeves 39 to rotate with the tubular shaft 20, or to remain stationary while the tubular shaft 20 rotates within the sleeves.

As best seen in FIG. 2, the unloader assembly 19 includes a first group of flexible flails 44 which are secured directly to the tubular shaft 20 and a second group of flexible flails 45 which are mounted on the collars 39. There are flexible flail members 44 at the front and rear of the container and flail members 45 in the central area of the container; and each of said flail members has a flail plate 44a or 45a, as the case may be, at its free end.

In a preferred mode of operation, the operator winds the flails 44 and 45 onto the unloader assembly before the container 12 is filled with material, and then folds the hinged leg 32 so as to release the clutch rod 26 and disengage the clutch pins 42 from the notches 40. A load of material which is to be spread upon a field is then unloaded first from the end portions of the container 12 by action of the flails 44, since the flails 45 on the stationary sleeves 39 do not unwind from the unloader assembly. When observation of the pattern of distribution shows the operator that most of the material has been unloaded from the end portions of the container, he pulls the control cord 43 to engage the clutch pins 42 in the notches 40, and the rotation of the sleeves 39 in conjunction with the tubular shaft 20 unwinds the flails 45 so as to unload the material from the central portion of the container.

Alternatively, a less desirable mode of operation is for the operator to fill the container with the collars 39 disengaged and the chains packed loosely in the litter. Then, after the end portions of the container are unloaded, engagement of the clutches will permit the chains to be withdrawn from the litter and the unloading operation to start in the central portion of the container.

The foregoing detailed description is given for clearness of understanding only, and no unnecessary limitations should be understood therefrom, as modifications will be obvious to those skilled in the art.

I claim:
1. A material spreader comprising, in combination: a wheeled material container having an arcuate wall providing the bottom and sides of the container; a rotatable unloader shaft extending longitudinally of the container; sleeve means mounted for rotation on said unloader shaft; a plurality of flexible flail members secured to said sleeve means and adapted to wind therearound; clutch means for clutching the shaft to the sleeve means for rotation therewith or releasing said shaft for rotation within the sleeve means; and clutch control means for selectively clutching or releasing the sleeve means at the will of an operator, whereby said flail members may be caused to unwind from said sleeve means at a controlled rate during rotation of the unloader shaft in response to operation of said clutch means.

2. A material spreader comprising, in combination: a wheeled material container having an arcuate wall providing the bottom and slides of the container; a rotatable unloader assembly extending longitudinally of the container, said assembly having first and second relatively movable means; a first group of flexible flail members secured to the first of said relatively movable means in spaced relationship to one another and in a first area of the container, said flail members being adapted to wind around said first of said relatively movable means; a second group of flexible flail members secured to the second of said relatively movable means in a second area of the container and adapted to retract and extend radially with respect to the assembly upon relative movement of said relatively movable means; and means for controlling the relative movement of said relatively movable means and thereby controlling the radial extension of said second group of flail members, whereby said first group of flail members may act to unload said first area of the container while the second group is retracted and the second group may thereafter be extended to unload said second area of the container.

3. The combination of claim 2 in which the first group of flail members is adjacent an end wall of the container and the second group of flail members occupies at least the central area of the container.

4. The combination of claim 2 in which the first of said relatively movable means comprises a hollow shaft supported on the end walls of the container, the second of said relatively movable means comprises sleeve means surrounding and rotatable with respect to said shaft, and the means for controlling the relative movement of said relatively movable means comprises a movable clutch rod in the hollow shaft and means on said clutch rod releasably engageable with said sleeve means.

5. A material spreader comprising, in combination: a wheeled material container having an arcuate wall providing the bottom and sides of the container; a hollow, rotatable unloader shaft extending longitudinally of the container, said hollow shaft having a plurality of openings; sleeve means mounted for rotation on said unloader shaft, said sleeve means being provided with a plurality of recesses which communicate with said openings; a plurality of flexible flail members secured to the sleeve means and adapted to wind therearound; clutch means mounted within the hollow shaft for rotation therewith; and radial pins on said clutch means extending through said openings for selective movement into and out of engagement with said recesses for clutching the shaft to the sleeve means for rotation therewith or releasing said shaft for rotation within the sleeve means, whereby said flail members may unwind from said sleeve means during rotation of the unloader shaft in response to operation of said clutch means.

6. The combination of claim 5 in which the clutch means is a rod mounted for longitudinal movement with respect to the shaft, the pins are integral with the clutch rod and move longitudinally in the shaft openings, and the recesses in the sleeves are in the form of marginal notches which radially overlap said openings.

7. The combination of claim 5 in which the openings in the shaft are longitudinally spaced, the sleeve means consists of a plurality of separate, short sleeve members each of which has a recess communicating with one of the openings, the clutch means includes a rod mounted within the shaft for rotation therewith, and radial pins on said clutch rod extend through said openings for selective movement into and out of engagement with said recesses.

8. The combination of claim 7 in which the clutch rod means is longitudinally slidable in the hollow shaft, the recesses in the sleeve members are in the form of notches in the edges of the sleeves, and the pins are selectively engageable with said notches by longitudinal movement of the clutch rod means.

9. The combination of claim 5 in which the clutch means includes a rod movable endwise in the shaft, spring means operatively engaged with the clutch rod and urging the latter endwise in the shaft, the radial pins are on said clutch rod, and means are provided for moving the clutch rod endwise against the urging of the spring means to move the pins into and out of engagement with the recesses.

References Cited in the file of this patent
UNITED STATES PATENTS

| 1,056,123 | Roderick et al. | Mar. 18, 1913 |
| 2,886,332 | Elwick | May 12, 1959 |
| 3,004,765 | Wilkes | Oct. 17, 1961 |